Oct. 6, 1931.  C. JACKSON  1,826,075
POWER UNIT OR PLANT FOR TRACK APPARATUS
Filed Nov. 8, 1930
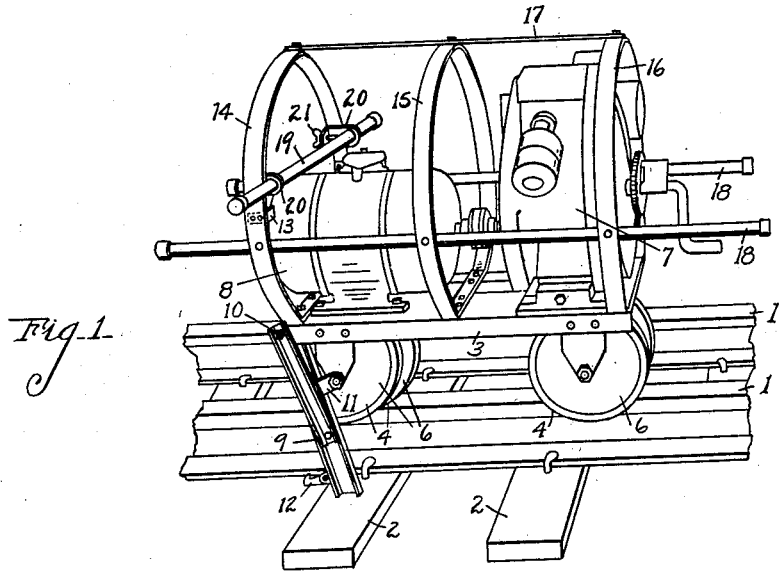
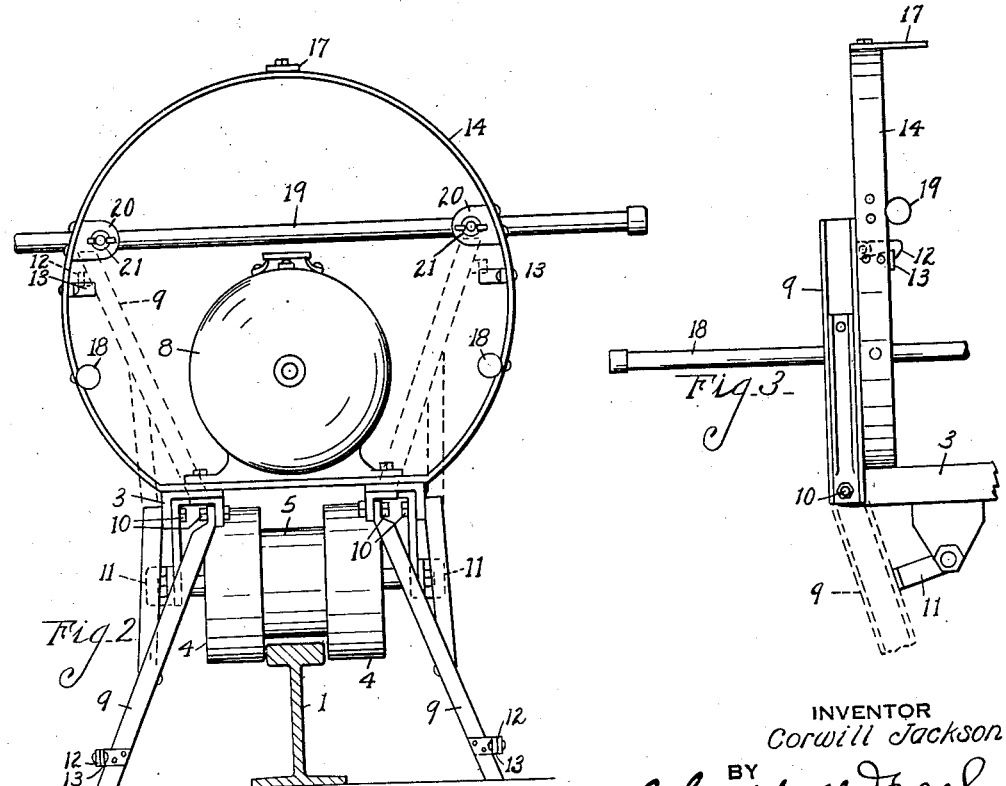
INVENTOR
Corwill Jackson
BY
Chappell Earl
ATTORNEYS Patented Oct. 6, 1931

1,826,075

UNITED STATES PATENT OFFICE

CORWILL JACKSON, OF CHICAGO, ILLINOIS

POWER UNIT OR PLANT FOR TRACK APPARATUS

Application filed November 8, 1930. Serial No. 494,289.

The main objects of this invention are:

First, to provide a power plant or unit for railway track working appliances such, for example, as tampers of the type illustrated in my United States Letters Patent No. 1,329,049, issued January 27, 1920.

Second, to provide a machine or apparatus of this character which may be very conveniently manipulated upon the track or on the ground as occasion may require, or upset or rolled from the track in emergencies without injury to the machine.

Objects pertaining to details and economies of my invention will definitely appear from the description to follow. The invention is defined in the claims.

A structure which embodies the features of my invention is clearly illustrated in the accompanying drawings in which:

Fig. 1 is a perspective view of my improved power plant shown in operative relation to railway track.

Fig. 2 is an end elevation, the rail being shown in vertical section and a portion of the transverse handle bar being broken away.

Fig. 3 is a fragmentary side elevation with the struts and braces in collapsed or inoperative position by full lines and in erected position by dotted lines.

In the accompanying drawings, 1 represents the rails of a railway track and 2 the ties thereof.

The embodiment of my invention illustrated consists of a truck 3 having alined carrying wheels 4 adapted to travel upon a single rail. These carrying wheels have central rail grooves 5 and side flanges 6 so that the wheels are adapted as ground wheels or to travel upon a rail.

Upon the truck I mount an internal combustion engine or other suitable motor 7 and a generator 8, these being arranged in longitudinal alinement on the truck. The motor and generator are illustrated mainly conventionally.

To support the truck in upright position upon a single rail, I provide struts 9 which are pivoted at 10 at one end of the truck to be swung down into engagement with a tie 2 and into supporting engagement with stops 11. When in engagement with the stops 11 it will be noted that the struts are inclined and they serve as blocking members for the truck. The adjacent wheel is preferably slightly lifted from the rail when the struts are in this position, thereby providing a three-point support for the truck. The struts are collapsed, however, by pushing the truck in the direction opposite to that in which the stops face.

Hooks 12 adapted to engage with keepers 13 are provided for supporting the struts in collapsed position. These keepers 13 are mounted on one of the curved guards 14, other similar guards 15 and 16 being provided. These guards are disposed in spaced relation transversely of the frame and are of such dimensions as to serve as supporting members when the truck is upset or rolled from a rail, guarding the power unit, that is, preventing it from coming into contact with the ground. The guards are connected at the top by the longitudinal bar 17.

Longitudinal end bars 18 are secured to the inner sides of the guards to project at each end so that the machine may be lifted to and from the rail thereby.

A transverse handle bar 19 is slidably mounted on the brackets 20 secured to the inner side of the guard 14 so that the handle bar may be adjusted to project at each side as shown in Fig. 1, or adjusted to project entirely at one side, according to the convenience in manipulating the machine along the track. The handle bar is designed to support the machine in upright position as it is trundled along the track. Set screws 21 are provided for locking the handle bar in its adjusted position on the brackets should this be desired.

In ordinary manipulation the machine is lifted on and off the track to accommodate passing trains, but in case of emergencies the machine may be upset or rolled from the track without serious injury thereto as the guards protect the power unit and permit the machine to roll over, even down a considerable embankment, without injury. Should the handle bar 19 be bent it is easily replaced.

The same is true of the struts. These, however, are braced as indicated so that they are not likely to be injured.

My improved power unit is easily handled and manipulated along the track as the work proceeds, and may be easily removed from the track should occasion require.

Having thus described my invention what I claim as new and desire to secure by Letters Patent is:

1. In a machine of the class described, the combination of a truck provided with alined wheels having central rail grooves and relatively wide flanges providing ground wheels, a motor and generator mounted on said truck in longitudinal alinement, spaced transversely disposed curved guards mounted on said truck and constituting supporting members when the truck is upset or rolled from a rail, struts mounted on said truck at one end and adapted when in erected position to support the truck in upright position on a rail, longitudinally disposed handle bars arranged on the inner sides of said guards to project at each end of the truck, and a transversely disposed handle bar mounted for longitudinal adjustment on one of said guards.

2. In a machine of the class described, the combination of a truck provided with alined wheels having central rail grooves and relatively wide flanges providing ground wheels a motor and generator mounted on said truck in longitudinal alinement, spaced transversely disposed curved guards mounted on said truck and constituting supporting members when the truck is upset or rolled from a rail, struts mounted on said truck at one end and adapted when in erected position to support the truck in upright position on a rail, and longitudinally disposed handle bars arranged on the inner sides of said guards to project at each end of the truck.

3. In a machine of the class described, the combination of a truck provided with alined wheels having central rail grooves and relatively wide flanges providing ground wheels, a motor and generator mounted on said truck in longitudinal alinement, spaced transversely disposed curved guards mounted on said truck and constituting supporting members when the truck is upset or rolled from a rail, struts mounted on said truck at one end and adapted when in erected postion to support the truck in upright position on a rail, and a transversely disposed handle bar mounted for longitudinal adjustment on one of said guards.

4. In a machine of the class described, the combination of a truck provided with alined wheels having central rail grooves and relatively wide flanges providing ground wheels, a motor and generator mounted on said truck in longitudinal alinement, spaced transversely disposed curved guards mounted on said truck and constituting supporting members when the truck is upset or rolled from a rail, and struts mounted on said truck at one end and adapted when in erected position to support the truck in upright position on a rail.

5. In a machine of the class described, the combination of a truck provided with alined wheels having central rail grooves and relatively wide flanges providing ground wheels, a motor and generator mounted on said truck in longitudinal alinement, and spaced transversely disposed curved guards mounted on said truck and constituting supporting members when the truck is upset or rolled from a rail.

6. In a machine of the class described, the combination of a truck provided with alined wheels having central rail grooves and relatively wide flanges providing ground wheels, a power unit mounted on said truck, spaced transversely disposed curved guards mounted on said truck and constituting supporting members when the truck is upset or rolled from a rail, struts pivotally mounted on said truck at one end and adapted when in erected position to support it in upright position on a rail and with one wheel lifted from the rail, and stops supporting said struts in erected position.

7. In a machine of the class described, the combination of a truck provided with alined wheels having central rail grooves and relatively wide flanges providing ground wheels, a power unit mounted on said truck, spaced transversely disposed curved guards mounted on said truck and constituting supporting members when the truck is upset or rolled from a rail, and struts mounted on said truck for supporting it in upright position on a rail.

8. In a machine of the class described, the combination of a truck provided with alined wheels having central rail grooves and relatively wide flanges providing ground wheels, a power unit mounted on said truck, and spaced transversely disposed curved guards mounted on said truck and constituting supporting members when the truck is upset or rolled from a rail.

9. In a machine of the class described, the combination of a truck provided with alined wheels arranged to travel upon a single rail or upon the ground, a power unit mounted on said truck, guards for said power unit constituting a supporting member when the truck is upset or rolled, struts pivotally mounted on said truck and adapted when in erected position to support it in upright position upon a rail with one wheel lifted from the rail, and stops for supporting said struts in erected position disposed to permit the collapsing of the struts when the truck is moved in a direction opposite to that in which the stops face.

10. In a machine of the class described, the combination of a truck provided with alined wheels arranged to travel upon a single rail or upon the ground, a power unit mounted on said truck, guards for said power unit constituting a supporting member when the truck is upset or rolled, and struts mounted on said truck and adapted when in erected position to support it in upright position upon a rail.

11. In a machine of the class described, the combination of a truck provided with alined wheels arranged to travel upon a single rail or upon the ground, a power unit mounted on said truck, guards for said power unit constituting a supporting member when the truck is upset or rolled, struts mounted on said truck and adapted when in erected position to support it in upright position upon a rail, and a transversely disposed handle bar mounted for longitudinal adjustment.

12. In a machine of the class described, the combination of a truck provided with alined wheels arranged to travel upon a single rail or upon the ground, a power unit mounted on said truck, guards for said power unit constituting a supporting member when the truck is upset or rolled, and a transversely disposed handle bar mounted for longitudinal adjustment.

13. In a machine of the class described, the combination of a truck provided with alined wheels arranged to travel upon a single rail or upon the ground, a power unit mounted on said truck, and guards for said power unit constituting a supporting member when the truck is upset or rolled.

In witness whereof I have hereunto set my hand.

CORWILL JACKSON.